United States Patent [19]

Bracke et al.

[11] 4,287,318

[45] Sep. 1, 1981

[54] PROCESS FOR PREPARING RUBBER REINFORCED STYRENIC RESINS

[75] Inventors: William J. I. Bracke, Hamme; Emmanuel Lanza, Brussels, both of Belgium

[73] Assignee: Labofina S.A., Brussels, Belgium

[21] Appl. No.: 134,474

[22] Filed: Mar. 27, 1980

[51] Int. Cl.³ .................. C08F 291/12; C08F 265/08; C08F 267/08
[52] U.S. Cl. ..................................... 525/313; 525/53; 525/244; 525/263; 525/265
[58] Field of Search ................. 525/313, 244, 53, 263, 525/265

[56] References Cited

U.S. PATENT DOCUMENTS 3,538,194  11/1970  Barrett et al. ........................ 525/313
3,951,932   4/1976  Coffey .................................. 525/313

FOREIGN PATENT DOCUMENTS 565897  11/1958  Canada ..................................... 525/313
710894   6/1965  Canada ..................................... 525/313
757531   9/1956  United Kingdom ..................... 525/313

*Primary Examiner*—William F. Hamrock

[57] ABSTRACT

A continuous process for preparing rubber reinforced resins which are copolymers of styrenic compound, acrylonitrile and diolefinic compound.

17 Claims, No Drawings

PROCESS FOR PREPARING RUBBER REINFORCED STYRENIC RESINS

TECHNICAL FIELD

The present invention relates to a new process for preparing rubber reinforced resins, in particular ABS resins, which are copolymers of styrenic compound, acrylonitrile and diolefinic compound.

BACKGROUND OF THE INVENTION

It is well known that styrene homopolymers and copolymers of styrene and acrylonitrile have poor impact strength. In order to increase this impact strength, rubber is added to these styrenic polymers where it acts as a reinforcing agent. A widely used method comprises polymerizing styrene in the presence of an unsaturated rubber. The products obtained by this method are more stable and have superior properties when compared with products prepared by other methods, such as blending or milling.

One usual technique for preparing rubber-reinforced styrenic resins consists of grafting chains of homo- or copolymers of styrene onto a rubber, either by an all emulsion process or an all suspension process or a mass-suspension process. Such techniques present an economic problem, as the manufacture of these reinforced styrenic resins depends on rubber supplies.

In order to decrease the costs of these reinforced styrenic resins, and to obviate some drawbacks of the prior processes, it has been proposed to prepare rubber reinforced styrenic resins by forming the rubber particles in situ in the presence of a rigid styrenic resin. The process comprises contacting a polystyrenic matrix and a monomer or a mixture of monomers forming a rubbery polymer or copolymer by polymerization and then suspension polymerizing said monomer(s) with formation of a rubber partly grafted to the matrix. The production of rubber reinforced styrenic resins by this method is a batch process. Moreover, the beads obtained by this suspension method must be washed, centrifuged and dried.

There exists a need in the art, therefore, for a less expensive method for producing rubber reinforced styrenic resins.

SUMMARY OF THE INVENTION

It is therefore an object of the present invention to provide a new process for the polymerization of monomers in the presence of a copolymeric matrix of styrenic compound and acrylonitrile.

It is another object of the present invention to provide an improved process for preparing rubber reinforced styrene-acrylonitrile type resins, wherein the rubber particles are formed in situ by mass polymerization in the presence of styrenic resins.

A further object of this invention is to provide an improved continuous process for mass polymerization of monomers, which forms a rubbery polymer in the presence of a styrene-acrylonitrile type matrix.

In order to accomplish the foregoing objects according to the present invention, there is provided a continuous process for preparing rubber reinforced styrenic resins of the ABS type, said process comprising the steps of:

(a) charging continuously a mixture obtained by adding a diolefinic compound to a solution of a copolymeric matrix of styrenic compound and acrylonitrile in an inert solvent, into a polymerization zone and subjecting said mixture to mass polymerization conditions whereby there is formed in situ a rubbery material in dispersion in said copolymer matrix, (b) withdrawing continuously the reaction mixture from said polymerization zone and subjecting it to a heat treatment to remove the residual diolefinic compound and the solvent, and (c) recovering the ABS resin.

DETAILED DESCRIPTION OF THE INVENTION AND ITS PREFERRED EMBODIMENTS

The process of the present invention for preparing rubber reinforced styrenic resins comprises the steps of adding a diolefinic compound to a solution of a copolymer of styrenic compound and acrylonitrile (or SAN matrix) in an inert solvent and in carrying out a continuous mass polymerization of said diolefinic compound with formation in situ of a rubbery polymer partly grafted on the copolymer matrix.

The copolymeric matrix or SAN matrix is a copolymer of styrenic compound and acrylonitrile. Methacrylonitrile may be used instead of or in admixture with acrylonitrile, such materials being herein collectively referred to as "acrylonitrile".

The styrenic compound which is most often used for preparing the copolymeric matrix is styrene, yet styrene derivatives, such as halogen-alkyl- and aryl-substituted styrene may be used in admixture with styrene. Specific examples of such styrene derivatives include the methyl styrenes, such as alpha-methyl styrene, vinyl toluene, p-chlorostyrene, phenyl styrenes, vinylnaphthalene, etc. As is known in the art, the amount of the styrene derivatives which can be optionally used in admixture with styrene may vary between wide limits. In the following text such materials are collectively referred to as "styrenic compound".

The amounts of styrenic compounds and acrylonitrile within the SAN matrix can also vary within wide limits. The amount of styrenic compound is preferably at least about 10% by weight, based on the copolymer, but may reach about 90 wt. % and even more. Generally, the weight ratio of styrenic compound to acrylonitrile varies between about 4:1 and 1:1.

The SAN matrix is dissolved in an inert solvent which acts also as a solvent or at least as a dispersing agent for the diolefinic compound. The inert solvent can be any saturated solvent boiling between about 120° C. and about 175° C. at atmospheric pressure and preferably between about 130° C. and about 150° C. The preferred solvents are saturated alkylbenzenes, such as ethylbenzene.

The solution of SAN matrix in the inert solvent may contain from about 10 to about 70 wt. % of SAN matrix. Lower concentrations of copolymeric matrix would require the removal of large amounts of solvent after the production of the ABS resin. On the other, the diolefinic compound is not easily dissolved or dispersed in a viscous solution having a content high in copolymeric matrix. Preferably, the solution will contain from about 20 to about 50 wt. % of copolymeric matrix.

The diolefinic compound which forms the rubbery component of the ABS resin by polymerization is selected from the group comprising the conjugated diolefinic hydrocarbons, such as butadiene, isoprene, 2,3-dimethyl-butadiene, chloroprene and mixtures thereof.

For economic reasons, butadiene preferably will be used for producing the ABS resins of the present invention.

According to the process of the present invention, the diolefinic compound is added to the solution of SAN matrix and is then continuously introduced into a polymerization zone where it is subjected to mass polymerization conditions to polymerize said diolefinic compound whereby there is formed in situ a rubbery material that is dispersed into said matrix.

According to one embodiment of this invention, the polymerization zone comprises two reactors. The solution of SAN matrix in the inert solvent and a separate stream of diolefinic compound are continuously introduced into the first reactor provided with a heating means and a stirrer. The reactor is heated up to a temperature which does not exceed about 100° C. and which is preferably maintained within the range of about 60° C. to 90° C. The residence time in this reactor depends on the temperature, on the concentration of the solution in SAN matrix and on the amount of diolefinic compound. These factors are selected not only to reach a complete dispersion of the diolefinic compound in the solution of SAN matrix with an optional prepolymerization of this compound in the matrix, but also to avoid a prematurate dimerization of diolefinic compound, before its dispersion in the matrix.

The mixture prepared in this first reactor is continuously withdrawn from the reactor and is then continuously introduced into the second reactor for mass polymerization of the diolefinic compound. The mass polymerization is performed in the presence of any free radical generating catalyst, preferably a peroxide, a perester or a perazo-compound, such as di-tert-butylperoxide, lauroyl peroxide, cumyl peroxide or hydroperoxide, azo-bis-isobutyronitrile or mixtures thereof. The amount of such catalysts can vary between about 0.02 and about 2.5 wt. %, and preferably between about 0.05 and about 1.5 wt. %, based on the total weight of the monomers and the copolymer. This polymerization is carried out at a temperature ranging between about 100° and 140° C.

One suitable way to perform the polymerization comprises using a staged isobaric stirred reactor as the second reactor. Such reactor is a cylindrical, elongated horizontal vessel provided with a longitudinal shaft and with baffles for partition into stages, each stage having an agitator associated with the shaft. Each baffle is provided with a top aperture for passage of evaporated vapor which is removed, condensed and recycled to the first reactor. Each baffle is also provided with a bottom aperture for passage of the polymerizing mixture. Control means are adapted to regulate pressure, temperature and flow of said mixture in each stage. The polymerization is a progressive multistage polymerization, under a substantially linear flow and under isobaric conditions.

The polymerization of the diolefinic compound can be carried out with the use of a mixture of two catalysts. One free radical generating catalyst has a short half-life, while the second catalyst has a longer half-life. By way of example, the catalyst system may comprise a mixture of a perester (such as tert-butyl perbenzoate or tert-butyl peracetate), and a peroxide (such as tert-butyl peroxide, dicumylperoxide or cumylhydroperoxide). In the first part of the reactor, polymerization is carried out at a temperature of about 100° to about 120° C. under the action of the perester catalyst. Complete conversion of the monomers is then carried out in the second part of the reactor, at a temperature of about 120° C. to about 140° C., under the action of the other catalyst.

The process, according to another embodiment of the invention, can also be applied by introducing into the first reactor only a part of the total amount of diolefinic compound. In this case, the process comprises charging continuously the first reactor with the solution of SAN matrix in the inert solvent and in charging also continuously the reactor with a separate stream of diolefinic compound, this latter being used in an amount which depends on the content in SAN matrix of the solution and which may vary between about 20 and about 40% of the total amount of diolefinic compound. The rest of this diolefinic compound is thereafter introduced continuously into the second reactor and/or in the line connecting the first and second reactors.

The diolefinic compound, more particularly butadiene, is used in amount such that the final ABS resin contains from about 3 to about 35 wt. % of butadiene, and more preferably, from about 5 to about 25 wt. % of butadiene, the rest being the SAN copolymer.

The ABS resin is continuously withdrawn from the second reactor and is treated to remove the solvent and the residual monomers. This treatment may be carried out by using known means. According to an embodiment of this invention, the mixture withdrawn from the second reactor is first subjected to a heat treatment in order to remove the unreacted diolefinic compound as quickly as possible, and is then subjected to a second treatment, for instance in a devolatilizer or on a film-type evaporator to remove the solvent and the rest of residual monomers. The ABS resin is thereafter extruded, generally in the presence of antioxidant and optionally in the presence of a conventional plasticizing agent. By utilizing the aforementioned process, it has been found that the final ABS resin is practically free from by-products, such as dimers of this diolefinic compound.

In the resulting ABS resin, the rubber formed in situ is highly dispersed in the continuous SAN phase and the final resin is practically gel-free. In the prior processes for producing rubber-reinforced styrenic resins, styrene or a mixture of styrenic and acrylonitrile was polymerized in the presence of a rubber. This latter is particularly effective when it is present during the polymerization of the monomers (styrene or styrene and acrylonitrile). Grafting of some monomer to rubber takes place and occlusion of polystrene or styrene-acrylonitrile copolymer extends the volume fraction of the dispersed, reinforcing rubber phase. This rubber contains double bonds which provide grafting sites and a high percentage of styrenic polymer chains are chemically grafted onto the rubbery polymer chains.

On the contrary, with the process of the present invention a copolymer matrix is first produced and thereafter the monomer material is added to the matrix and then polymerized to form a rubbery polymer. This latter is only partly grafted onto the matrix. However, it has been unexpectedly found that the resulting ABS resin has enhanced properties.

This result is believed to be achieved because the monomer material is uniformly dispersed in the copolymer matrix, and polymerization of this monomer material is confined to the matrix, without production of separate particles of rubbery polymer, thus without gel formation.

The final ABS resin is characterized by the high degree of homogeneity of the rubber particles throughout the copolymer matrix.

The above embodiments of the present invention have been described to show some forms of application. Some variations and modifications are feasible without departing from the scope of this invention. For instance, particularly valuable results are obtained when the process is applied by polymerization of butadiene in the presence of a SAN matrix which has been prepared from a mixture of styrene and acrylonitrile monomers containing a low amount of sequenced block copolymer of butadiene (B) and styrene (S). Any known block copolymer, either linear or radial, of the B-S-B or S-B-S type, may be used in an amount which generally does not exceed about 5%, based on the total weight of styrene and acrylonitrile monomers.

We claim:

1. A process for the continuous production of ABS-type resins which are copolymers of a styrenic compound, acrylonitrile and conjugated diolefinic hydrocarbon compound, which comprises the steps of;
    (a) charging continuously a diolefinic compound and a solution of a copolymeric matrix of styrenic compound and acrylonitrile in an inert saturated hydrocarbon solvent having a boiling point ranging between 120° and 175° C., into a polymerization zone comprising at least a first and second reactor,
    (b) subjecting the mixture thus formed to mass polymerization in said first reactor at a temperature less than about 100° C.,
    (c) thereafter continuously changing subjecting said mixture to mass polymerization in said second reactor at a temperature ranging from about 100° to about 140° C. in the presence of from about 0.02 to about 2.5 weight percent of free radical generating catalyst, based on the total weight of copolymeric matrix and diolefinic compound, whereby there is formed in situ during said mass polymerization in said first and second reactors a rubbery material dispersed in said copolymer matrix,
    (d) withdrawing continuously the reaction mixture from said polymerization zone and subjecting it to a heat treatment to remove the residual diolefinic compound and the solvent, and
    (e) recovering the ABS resin.

2. The process as defined in claim 1, wherein the styrenic compound within the copolymeric matrix is styrene.

3. The process as defined in claim 1, wherein the amount of styrenic compound in the copolymeric matrix ranges between about 20% and about 90% by weight.

4. The process as defined in claim 3, wherein the weight ratio of styrenic compound to acrylonitrile ranges between about 4:1 and about 1:1.

5. The process as defined in claim 1, wherein the copolymeric matrix contains a sequenced block copolymer of butadiene and styrene in an amount which does not exceed 5%, based on the total weight of styrenic compound and acrylonitrile.

6. The process as defined in claim 1, wherein the solvent has a boiling point ranging between about 130° and 150° C.

7. The process as defined in claim 1, wherein the solvent is an alkylbenzene.

8. The process as defined in claim 7, wherein the alkylbenzene is ethylbenzene.

9. The process as defined in claim 1, wherein the solution of copolymeric matrix comprises from about 10 to about 70 wt. % of copolymeric matrix.

10. The process as defined in claim 1, wherein the solution comprises from about 20 to about 50 wt. % of copolymeric matrix.

11. The process as defined in claim 1, wherein the diolefinic hydrocarbon is butadiene.

12. The process as defined in claim 1, wherein the diolefinic compound is used in an amount ranging between about 3% and about 35%, based on the weight of final ABS-type resin.

13. The process as defined in claim 12, wherein the amount of diolefinic compound ranges between about 5% and about 25%, based on the weight of final ABS-type resin.

14. The process as defined in claim 1, wherein the polymerization zone contains two reactors and the solution of the copolymeric matrix and a separate stream of diolefinic compound are continuously introduced into the first reactor at a temperature ranging from about 60° C. to about 90° C. and the mixture is continuously withdrawn from the first reactor and is then introduced into the second reactor for mass polymerization of the diolefinic compound.

15. The process as defined in claim 1, wherein the polymerization zone contains two reactors and the solution of the copolymeric matrix and a separate stream of a part of the total amount of diolefinic compound are continuously introduced into the first reactor, and the obtained mixture is continuously withdrawn from said first reactor and is then introduced into the second reactor together with the rest of the diolefinic compound.

16. The process as defined in claim 15, wherein the amount of diolefinic compound introduced into the first reactor ranges from about 20% to about 40% of the total amount of diolefinic compound.

17. The process as defined in claim 1, wherein the amount of catalyst ranges between about 0.05 and 1.5% based on the weight of copolymeric matrix and diolefinic compound.

* * * * *

UNITED STATES PATENT AND TRADEMARK OFFICE
CERTIFICATE OF CORRECTION

PATENT NO. : 4,287,318
DATED : September 1, 1981
INVENTOR(S) : William J. BRACKE and Emmanuel LANZA It is certified that error appears in the above—identified patent and that said Letters Patent is hereby corrected as shown below:

Column 5, line 35, kindly delete "changing" and insert instead -- charging and --.

Signed and Sealed this

Thirty-first Day of August 1982

[SEAL]

Attest:

GERALD J. MOSSINGHOFF

Attesting Officer

Commissioner of Patents and Trademarks